(12) United States Patent
Mizuno

(10) Patent No.: US 9,338,421 B2
(45) Date of Patent: May 10, 2016

(54) IMAGING APPARATUS AND CONTROL METHOD FOR THE SAME, SHOOTING CONTROL APPARATUS, AND SHOOTING CONTROL METHOD

(71) Applicant: CANON KABUSHIKI KAISHA, Tokyo (JP)

(72) Inventor: Takashi Mizuno, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 55 days.

(21) Appl. No.: 13/938,129

(22) Filed: Jul. 9, 2013

(65) Prior Publication Data

US 2013/0294741 A1 Nov. 7, 2013

Related U.S. Application Data

(63) Continuation of application No. 13/224,997, filed on Sep. 2, 2011, now Pat. No. 8,503,856.

(30) Foreign Application Priority Data

Sep. 8, 2010 (JP) ................................. 2010-201063

(51) Int. Cl.
```
H04N 9/87      (2006.01)
H04N 5/232     (2006.01)
H04N 5/262     (2006.01)
H04N 5/77      (2006.01)
```
(52) U.S. Cl.
CPC ................. *H04N 9/87* (2013.01); *H04N 5/232* (2013.01); *H04N 5/23245* (2013.01); *H04N 5/23293* (2013.01); *H04N 5/2621* (2013.01); *H04N 5/772* (2013.01)

(58) Field of Classification Search
None
See application file for complete search history.

(56) References Cited

U.S. PATENT DOCUMENTS

| | | | |
|---|---|---|---|
| 2003/0020833 A1* | 1/2003 | Akiyoshi | H04N 5/262 348/578 |
| 2004/0081437 A1* | 4/2004 | Asada | H04N 5/77 385/233 |
| 2004/0096190 A1* | 5/2004 | Uenaka et al. | 386/95 |
| 2004/0156616 A1* | 8/2004 | Strub et al. | 386/46 |
| 2005/0219378 A1* | 10/2005 | Kubota et al. | 348/222.1 |
| 2010/0026849 A1* | 2/2010 | Hamada | H04N 5/772 348/231.99 |
| 2010/0220214 A1* | 9/2010 | Fukushima et al. | 348/231.99 |

FOREIGN PATENT DOCUMENTS

| CN | 1984304 A | 6/2007 |
|---|---|---|
| CN | 101491083 A | 7/2009 |
| CN | 101621617 A | 1/2010 |

(Continued)

*Primary Examiner* — Hung Dang
*Assistant Examiner* — Sunghyoun Park
(74) *Attorney, Agent, or Firm* — Canon U.S.A., Inc. IP Division

(57) ABSTRACT

An imaging apparatus includes a shooting rate setting unit configured to set a shooting rate, a shooting unit configured to shoot a moving image at the shooting rate set by the shooting rate setting unit, an acquisition unit configured to acquire a shooting duration time from a start of shooting, a calculation unit configured to calculate a playback time based on a playback rate in a case of playing back the moving image shot by the shooting unit, and a display control unit configured to display the shooting duration time acquired by the acquisition unit and the playback time calculated by the calculation unit together on a display unit while the shooting is conducted by the shooting unit.

7 Claims, 13 Drawing Sheets

(56) References Cited

FOREIGN PATENT DOCUMENTS

| | | | |
|---|---|---|---|
| JP | 2003-163866 | A | 6/2003 |
| JP | 2006-180315 | A | 7/2006 |
| JP | 2008-099229 | A | 4/2008 |
| WO | WO2007/094403 | * | 8/2007 |

* cited by examiner

IMAGING APPARATUS AND CONTROL METHOD FOR THE SAME, SHOOTING CONTROL APPARATUS, AND SHOOTING CONTROL METHOD

CROSS REFERENCE TO RELATED APPLICATIONS

The present application is a continuation of U.S. patent application Ser. No. 13/224,997, filed Sep. 2, 2011, entitled "IMAGING APPARATUS AND CONTROL METHOD FOR THE SAME, SHOOTING CONTROL APPARATUS, AND SHOOTING CONTROL METHOD", the content of which is expressly incorporated by reference herein in its entirety. Further, the present invention claims priority from Japanese Patent Application No. 2010-201063 filed Sep. 8, 2010, which is hereby incorporated by reference herein in its entirety.

BACKGROUND OF THE INVENTION

1. Field of the Invention

The present invention relates to time information display during moving image shooting.

2. Description of the Related Art

A camera which is capable of generating a moving image in which a shooting time and a time required for playing back from beginning to end are different from each other has been proposed. In the case where interval shooting is performed by using such a camera, the time of shooting a moving image and a time required for playing back the moving image from beginning to end are different from each other.

For example, in an imaging apparatus discussed in Japanese Patent No. 03586580, in the case where a user selects a 10× (ten times) mode in an interval shooting mode, a shooting operation is performed in such a manner that 10 seconds of shooting is 1 second of playback.

In FIG. 4 of Japanese Patent No. 03586580, a playback time which is the time elapsed from the start of playback and a real time during shooting are displayed. However, there is an issue that it is difficult to know the time required for playing back a shot moving image during the shooting.

SUMMARY OF THE INVENTION

According to an aspect of the present invention, an imaging apparatus includes a shooting rate setting unit configured to set a shooting rate, a shooting unit configured to shoot a moving image at the shooting rate set by the shooting rate setting unit, an acquisition unit configured to acquire a shooting duration time from a start of shooting, a calculation unit configured to calculate a playback time based on a playback rate in a case of playing back the moving image shot by the shooting unit, and a display control unit configured to display the shooting duration time acquired by the acquisition unit and the playback time calculated by the calculation unit together on a display unit while the shooting is conducted by the shooting unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
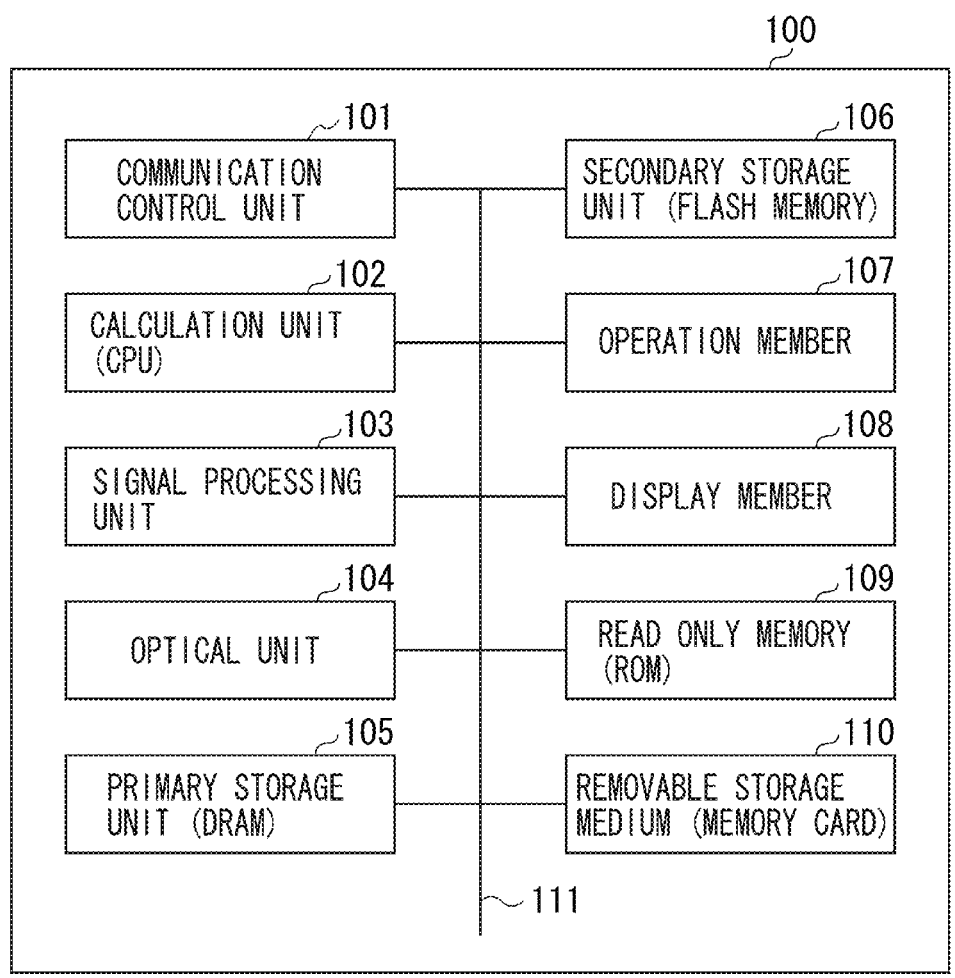
FIG. 1 is a diagram illustrating a configuration of an imaging apparatus according to a first exemplary embodiment of the present invention.

FIG. 1 is a diagram illustrating a configuration of an imaging apparatus 100 according to a first exemplary embodiment of the present invention.

A communication control unit 101 is a unit which performs communication with an information processing apparatus and controls wired or wireless communication with the information processing apparatus.

A calculation unit (central processing unit (CPU)) 102 performs control of the overall imaging apparatus 100 based on an inputted signal and a program. Also, the CPU 102 performs calculation of a playback time based on a value of a shooting time or the like.

A signal processing unit 103 performs processing such as compression coding, contour enhancement, and noise elimination of a shot moving image.

An optical unit 104 includes a lens, an autofocus driving motor, a zoom driving motor, and the like.

A primary storage unit (DRAM) 105 is used as a temporary storage area or the like of the CPU 102.

A secondary storage unit 106 is a nonvolatile storage unit such as a flash memory and stores various parameters.

An operation member 107 includes a cursor key, set/execute button, a menu button, and the like, and a user can use the operation member 107 for calling up a menu and selecting and deciding various settings in the imaging apparatus 100. The operation member 107 functions as a unit for setting and changing a shooting rate and also as a unit for setting a shooting mode such as interval shooting and high speed shooting when used together with the menu.

A display member 108 is a member which displays moving image data and a graphical user interface (GUI), and a liquid crystal device (LCD), for example, is used for the display member 108. The CPU 102 functions as a display control unit which sets contents to be displayed on the display member 108.

A read only memory (ROM) 109 stores a control program to be loaded on the CPU 102.

A removable storage medium 110 is a removable medium such as a memory card and stores data. The imaging apparatus 100 has an interface (not illustrated) for accessing the removable storage medium 110 and accesses moving image data.

A CPU bus 111 includes an address bus, a data bus, and a control bus.

Figure 2:
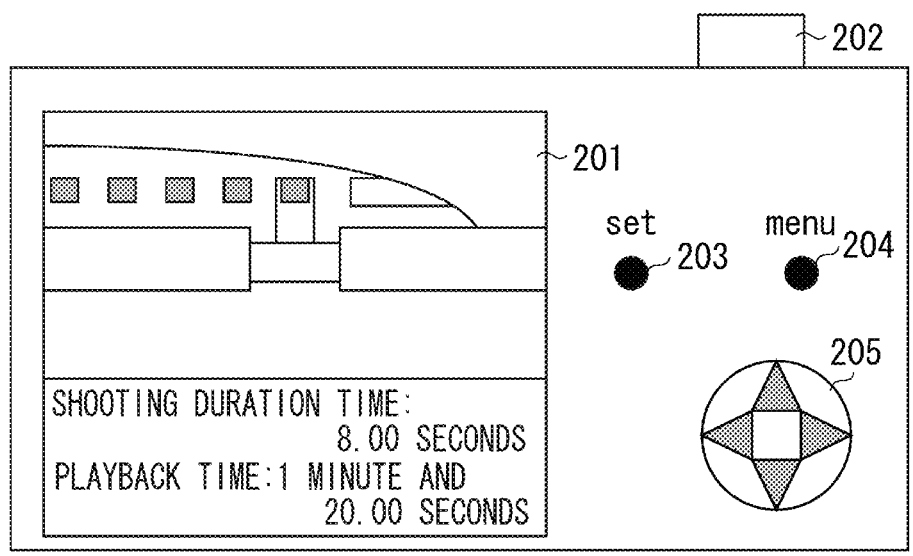
FIG. 2 is a diagram illustrating an appearance of the imaging apparatus.

FIG. 2 is a diagram illustrating an appearance of the imaging apparatus 100.

A liquid crystal display (LCD) 201 displays a menu screen, an image, and time information and corresponds to the display member 108 of the imaging apparatus 100. In the time information to be displayed, an upper one is a shooting duration time and a lower one is a playback time. The user can confirm a shooting duration time and a playback time during shooting by viewing the shooting duration time and the playback time displayed on the LCD 201.

Illustrated in FIG. 2 is a case where a shooting rate is 300 frames per second (fps) and a playback rate is 30 fps. It is understood that a time which is 10 times of the shooting duration time is required as the playback time of the moving image.

Illustrated in FIG. 2 is the case of moving image shooting of a moment when a limited express train passes through a platform.

In the example illustrated in FIG. 2, the shooting duration time is 8.00 seconds and the playback time is one minute and 20.00 seconds. From the playback time, it is understood that the moment of 8.00 seconds in the shooting duration time is when the moving image has been played back for one minute and 20.00 seconds in the case of playing back the obtained moving image from the beginning after terminating the moving image shooting.

In the case where the shooting rate is 600 fps and the playback rate is 30 fps, the required playback time is 20 times of the shooting time. In the case where shooting a moving image is performed for 10 seconds, 3 minutes and 20 seconds is required for playing back the moving image. When the playback time might be too long for some of users, it is useful for such users to know the time required for playback during the shooting.

A button 202 is used for instructing a start of shooting and termination of shooting.

A set button 203 is used for deciding various settings.

A menu button 204 is used for displaying a menu. Details of the menu will de described later.

A cursor key 205 includes 4 buttons of upper, lower, left, and right buttons.

The buttons 202 to 204 and the cursor key 205 correspond to the operation member 107 of the imaging apparatus 100 illustrated in FIG. 1.

Figure 3A:
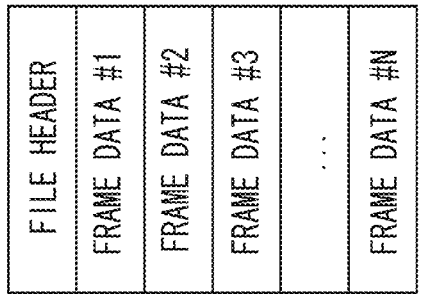
FIG. 3A and FIG. 3B are diagrams illustrating a structure of moving image data for one frame.

Hereinafter, a structure of moving image data for one frame (hereinafter referred to as recording frame data) will be described. The structure of the recording frame data is illustrated in FIG. 3A. As illustrated in FIG. 3A, the recording frame data includes frame information and compressed frame data. The compressed frame data are compressed image data itself, and the frame information is additional information of the compressed frame data.

In the present embodiment, the following information is included as the frame information:
Number of bytes of frame information (2 bytes);
Number of bytes of compressed frame data (8 bytes);
Time code (8 bytes);
Shooting date and time (8 bytes);
Shooting mode (1 byte); and
Reserved area (5 bytes).

An area of each of the information has the data size shown in the brackets. A value of "number of bytes of frame information" is 32 bytes and is a fixed value.

"Number of bytes of compressed frame data" is varied depending on frame data, and a data size of the compressed frame data is set as "number of bytes of compressed frame data".

As "time code", time information from a start of shooting is recorded by the unit of one millisecond (ms).

As "shooting date and time", information of date and time of shooting a moving image is recorded by the unit of one ms. The shooting time and date in the present exemplary embodiment is a time when the start of shooting is instructed. The information may be replaced by that of shooting termination or the like.

As "shooting mode", a value indicating a mode of a shot moving image is recorded. Included in the shooting mode are a normal mode, an interval shooting mode, and a high speed shooting mode. In the normal mode, since the shooting rate and the playback rate are the same, the shooting duration time and the playback time are the same. In the interval shooting mode, since the shooting rate is lower than the playback rate, the shooting duration time is longer than the playback time.

In the high speed shooting mode, since the shooting rate is higher than the playback rate, the playback time is longer than the shooting duration time.

"Reserved area" is an area which is not currently used but is reserved for future use. In the present exemplary embodiment, 0 is set for each of the reserved areas.

Figure 3B:
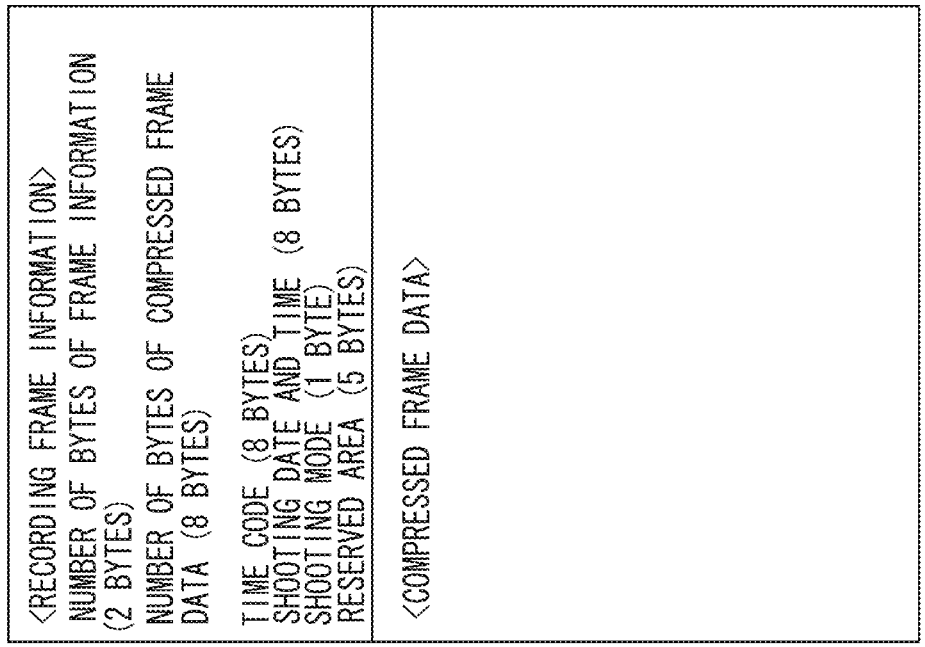

As illustrated in FIG. 3B, the moving image data is recorded as successive frame data. There is a file header at a leading end in FIG. 3B. The file header is additional information of the moving image data. After the file header, the frame data is recorded by the unit of 1 frame as illustrated in FIG. 3A.

In the present exemplary embodiment, the mode illustrated in FIGS. 3A and 3B is not limitative, and any mode is adopted to the present exemplary embodiment insofar as the mode enables displaying the shooting duration time and the time required for playing back the moving image for the user.

Figure 4:
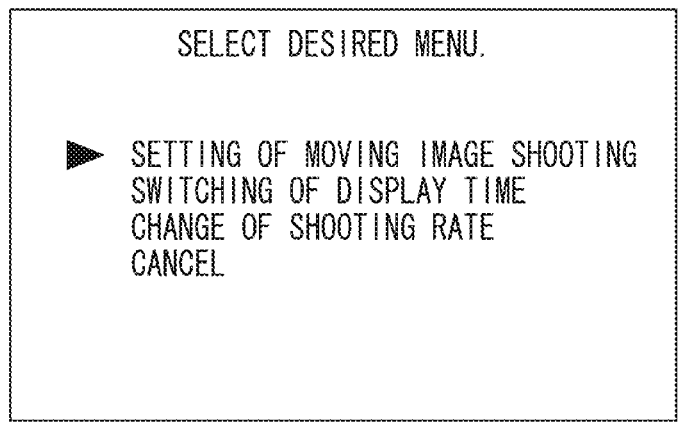
FIG. 4 is a diagram illustrating a menu screen.

Hereinafter, the menu will be described. The menu illustrated in FIG. 4 is displayed on the LCD 201 when the user presses the button 204. The menu to be displayed is "setting of moving image shooting", "switching of display time", "change of shooting rate" and "cancel".

"Setting of moving image shooting" is the menu to be used for inputting various settings for shooting a moving image. Upon reception of the operation via the menu, the CPU 102 functions as a shooting mode selection unit and also as a shooting rate setting unit.

"Switching of display time" is the menu to be used for switching the time to be displayed during the moving image shooting. As the information to be displayed on the display unit, both of the shooting duration time and the playback time or either one of them may be selected.

Upon reception of the operation via the menu, the CPU 102 functions as a display time selection unit.

"Changing of shooting rate" is the menu to be used for changing the shooting rate during shooting a moving image.

The user selects one of the menu items by using the cursor key 205 and decides the desired menu item by using the button 203.

Hereinafter, a method of inputting settings for moving image shooting will be described.

Figure 5:
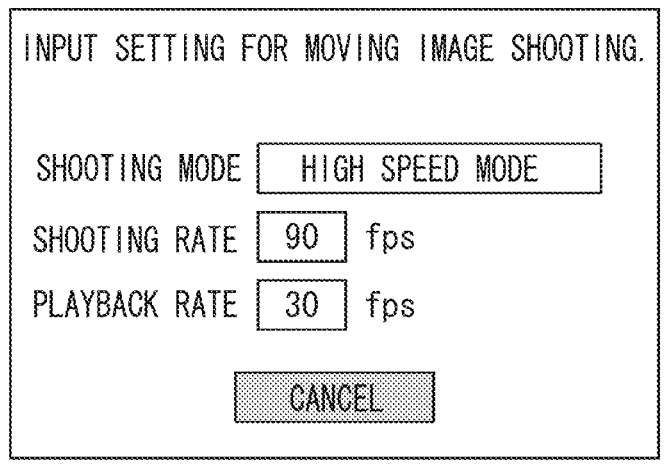
FIG. 5 is a diagram illustrating a screen displayed when inputting settings for moving image shooting.

The user selects "setting of moving image shooting" in the menu illustrated in FIG. 4 and presses the button 203, so that a screen illustrated in FIG. 5 for inputting settings for moving image shooting is displayed on the LCD 201. The items to be set are the shooting mode, the shooting rate, and the playback rate. Included in the shooting mode are the normal mode, the interval shooting mode, and the high speed shooting mode. Each of values of the shooting rate and the playback rate to be designated is the number of frames per second. The user designates the items of shooting mode, shooting rate, and playback rate by using the cursor key 205 to select the desired option and decides the settings by pressing the button 203.

Hereinafter, one example of switching the time information to be displayed will be described.

Figure 6:
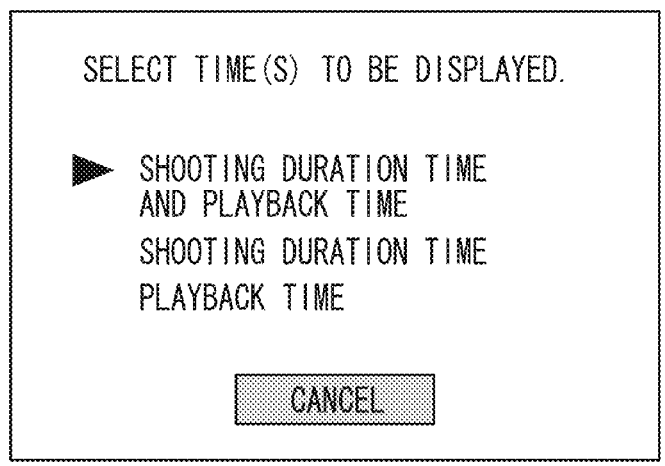
FIG. 6 is a diagram illustrating a screen for displaying a menu for switching time display.
Figure 7A:
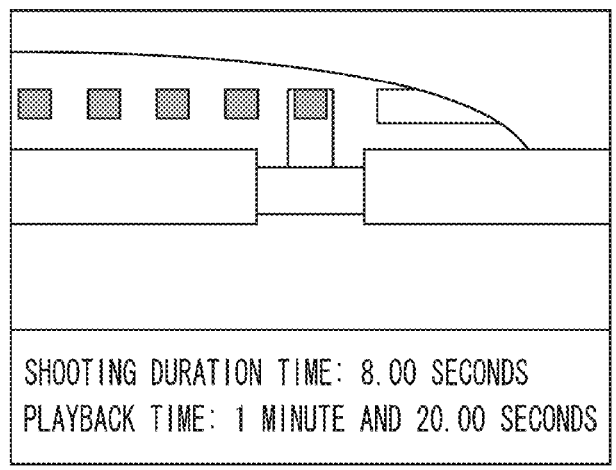
FIGS. 7A to 7C are diagrams each illustrating the time which is designated in the menu for switching time display.

The user selects "change of display time" in the menu illustrated in FIG. 4 and presses the button 203, so that a screen illustrated in FIG. 6 for selecting the time information to be displayed is displayed on the LCD 201. In the case where the shooting rate and the playback rate are the same as those in the case illustrated in FIG. 2, when "shooting duration time and playback time" are selected in the screen illustrated in FIG. 6, a screen illustrated in FIG. 7A is displayed on the LCD 201. The time information displayed on the screen illustrated in FIG. 7A is both of the shooting duration time and the playback time as in FIG. 2.

Figure 7B:
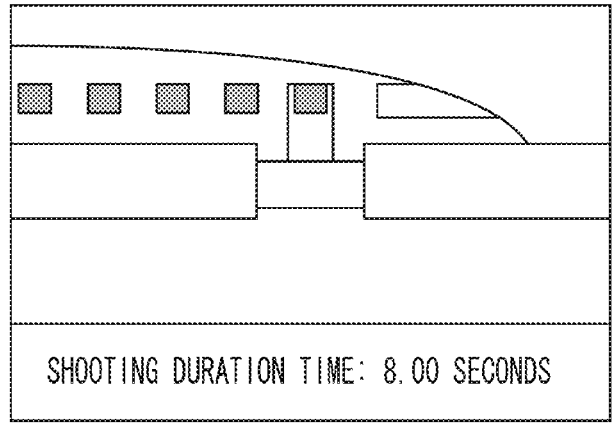

A screen illustrated in FIG. 7B is displayed on the LCD 201 when "shooting duration time" is selected on the screen illustrated in FIG. 6. The time information to be displayed on the screen illustrated in FIG. 7B is the shooting duration time only.

Figure 7C:
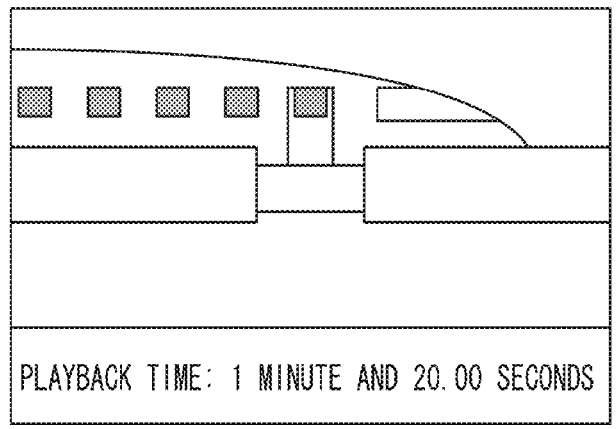

A screen illustrated in FIG. 7C is displayed on the LCD 201 when "playback time" is selected on the screen illustrated in FIG. 6. The time information to be displayed on the screen illustrated in FIG. 7C is the playback time only.

Hereinafter, processing for shooting to be executed under the control by the CPU 102 will be described with reference to FIG. 8.

In step S801, the user inputs the shooting mode, shooting rate, and playback rate. The shooting mode, shooting rate, and playback rate are inputted via the screen for setting of moving image shooting illustrated in FIG. 5.

After the setting is terminated in step S801, and upon reception of a shooting start instruction which is given by the user, the shooting is started in step S809.

In step S802, the CPU 102 obtains from a not-illustrated timer a shooting duration time from the start of shooting.

In step S803, the CPU 102 determines whether the set shooting mode is the one in which the shooting duration time and the playback time are different from each other, i.e. whether the shooting mode is the interval shooting mode or the high speed shooting mode.

In the case where the set shooting mode is the interval shooting mode or the high speed shooting mode in step S803 (YES in step S803), the step proceeds to step S804. In the case where the shooting mode is the one in which the shooting duration time and the playback time are the same (NO in step S803), i.e. the normal mode, the processing proceeds to step S806.

In step S804, the CPU 102 performs processing required for calculating the playback time. Details are described below with reference to FIG. 9.

In step S805, the CPU 102 displays both of the shooting duration time and the playback time or either one of them according to the setting on the screen illustrated in FIG. 6. After the processing in step S805, the processing proceeds to step S807.

In step S806, the CPU 102 displays only the shooting duration time, and the processing proceeds to step S807.

In step S807, the CPU 102 records moving image data. In the present exemplary embodiment, data for one frame is recorded.

In step S808, the CPU 102 determines whether the shooting is terminated. In the case where it is not determined that the shooting is terminated in step S808, the processing returns to step S802. In the case where it is determined that the shooting is terminated in step S808, the CPU 102 terminates the shooting processing.

Figure 9:
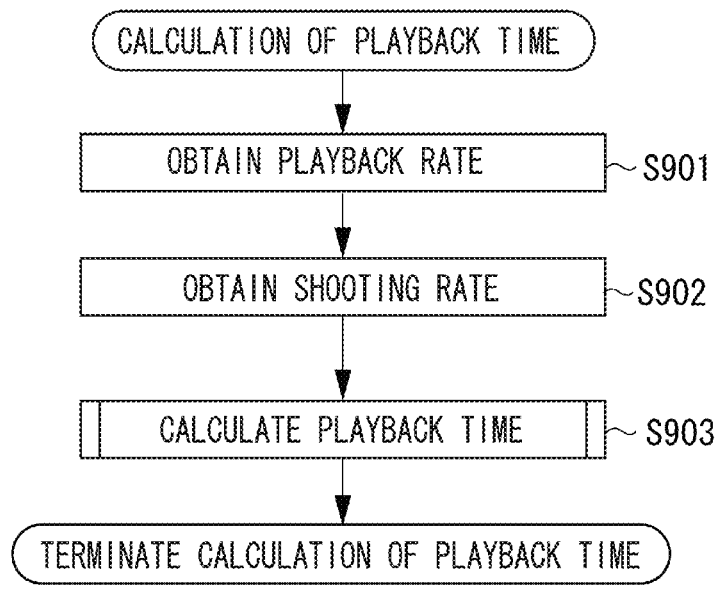
FIG. 9 is a diagram illustrating a procedure for calculating a playback time according to the first exemplary embodiment.

Hereinafter, the procedure for playback time calculation processing will be described with reference to FIG. 9.

In step S901, the CPU 102 obtains the playback rate set in FIG. 5.

In step S902, the CPU 102 obtains the shooting rate set in FIG. 5.

In step S903, the CPU 102 calculates a playback time in the case of playing back the image based on the obtained playback rate and shooting rate. The playback time tp is obtained by the following expression when the shooting rate is R; the playback rate is Rp; and the shooting duration time is t:

$$tp = \frac{R}{Rp}t$$

For example, in the case where the shooting rate is 90 fps; the playback rate is 30 fps; and the shooting duration time is 20 seconds, the playback time of the moving image is:

$$tp=90 \text{ (fps)}/30 \text{ (fps)} \times 20 \text{ (sec)}=60 \text{ (sec)}.$$

Figure 8:
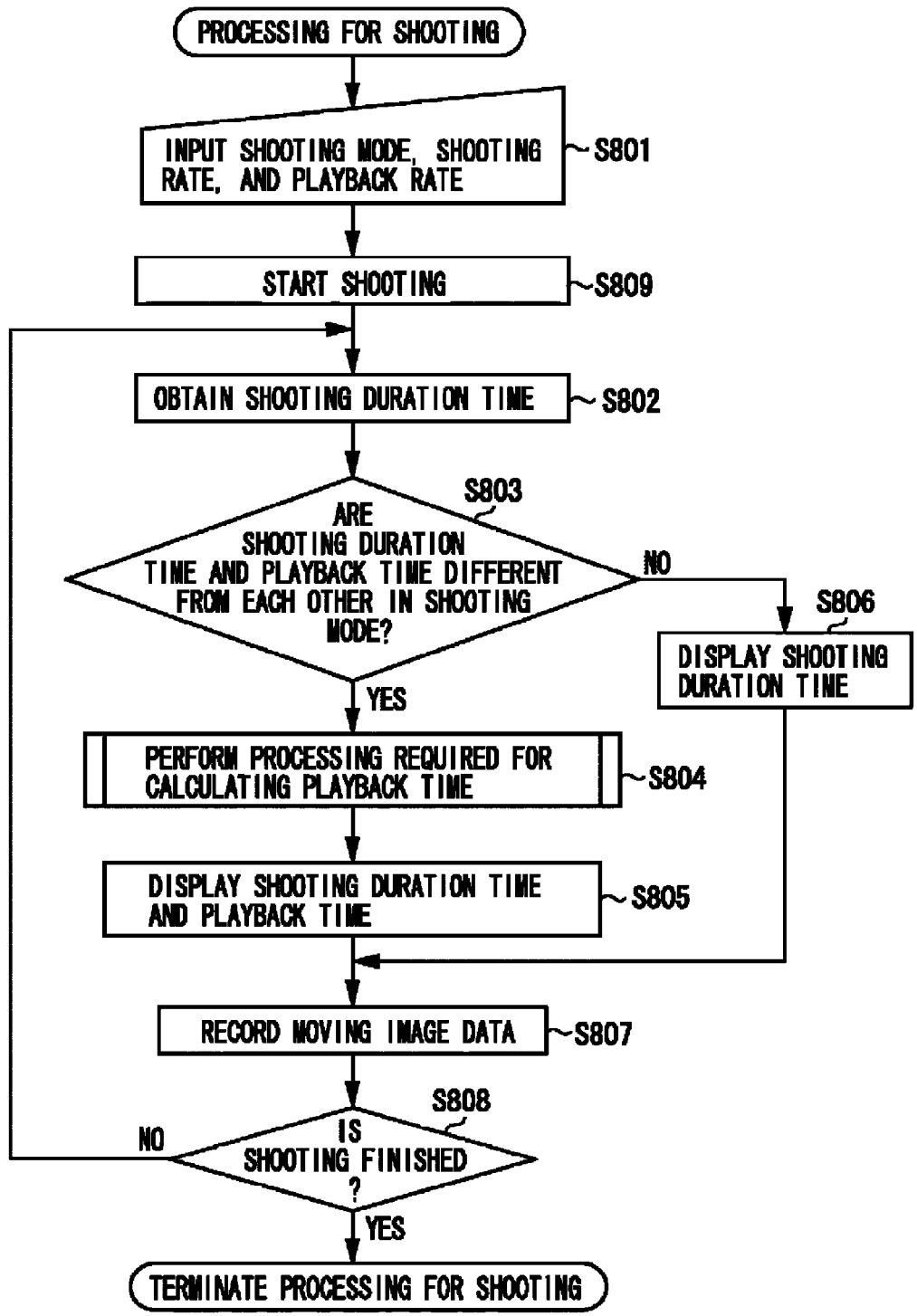
FIG. 8 is a diagram illustrating a procedure for shooting according to the first exemplary embodiment.
Figure 10A:
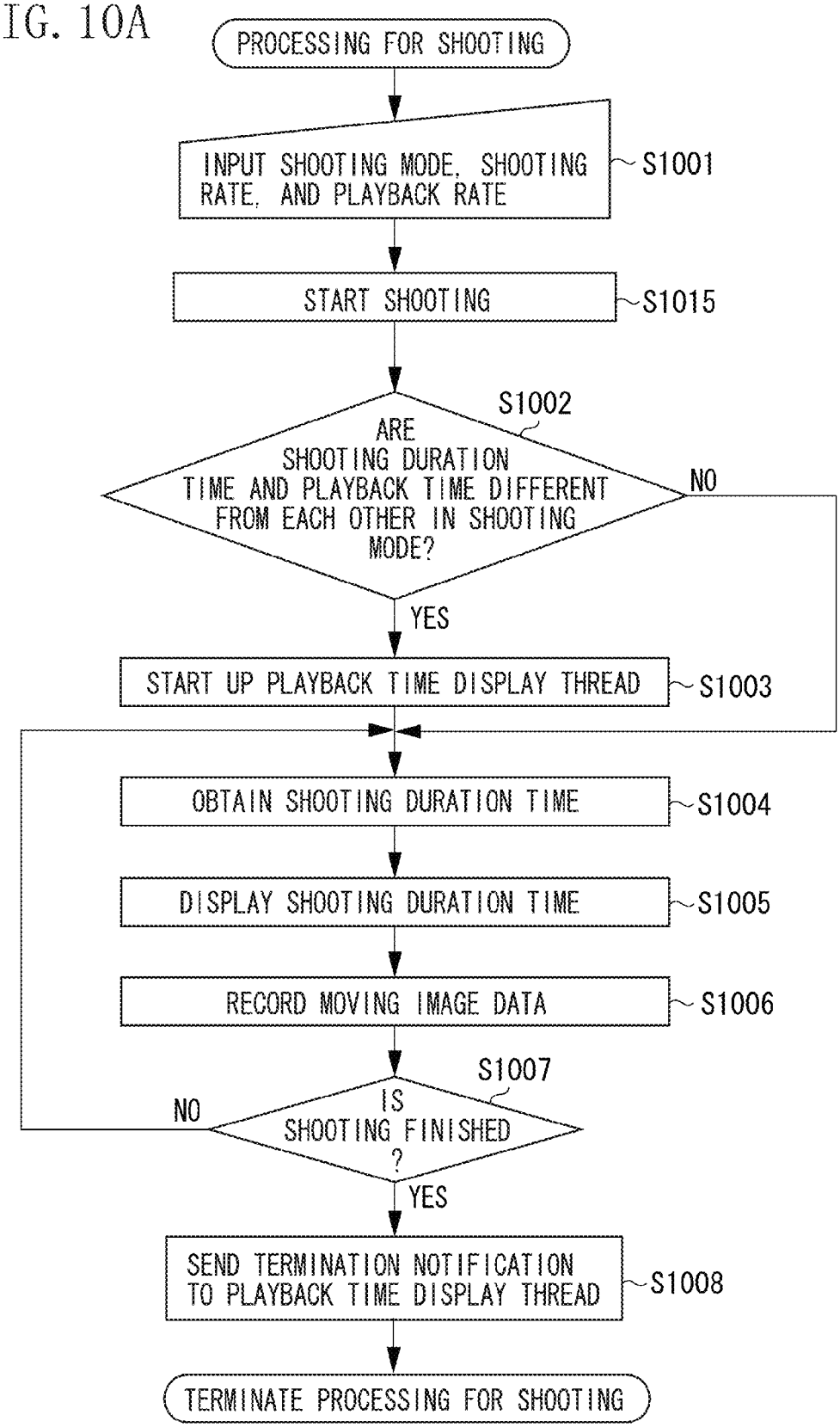
FIGS. 10A and 10B are diagrams illustrating a procedure for asynchronously displaying a shooting duration time and a playback time.

Though the timings for updating the displays of the shooting duration time and the playback time are synchronized in the processing illustrated in FIG. 8, the timings for updating the displays of the shooting duration time and the playback time may be performed asynchronously. Hereinafter, a procedure for the processing of asynchronously updating the displays of the shooting duration time and the playback time will be described with reference to FIG. 10A.

In step S1001, the user inputs a shooting mode, a shooting rate, and a playback rate. The inputs of the shooting mode, shooting rate, or playback rate are performed via the screen for inputting settings for moving image shooting illustrated in FIG. 5.

After the settings are inputted in step S1001 and upon reception of an instruction for staring shooting from the user, the shooting is started in step S1015.

In step S1002, the CPU 102 determines whether the set shooting mode is the one in which the shooting duration time and the playback time are different from each other. The shooting mode in which the shooting duration time and the playback time are different from each other is the interval shooting mode or the high speed shooting mode.

The processing proceeds to step S1003 in the case where the set shooting mode is the one in which the shooting duration time and the playback time are different from each other in step S1002 (YES in step S1002). The processing proceeds to step S1004 in the case where the set shooting mode is the one in which the shooting duration time and the playback time are the same in step S1002 (NO in step S1002).

Figure 10B:
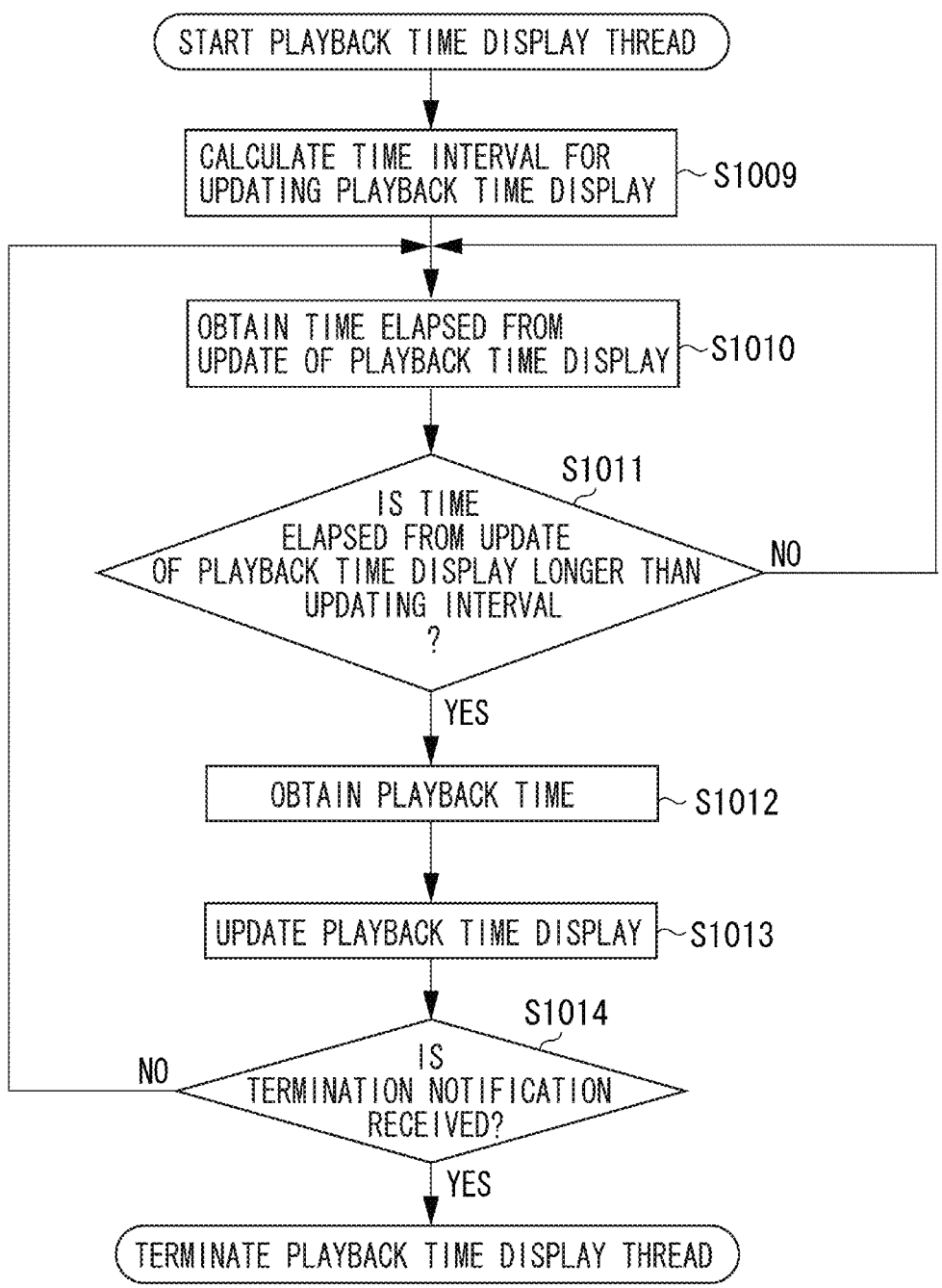

In step S1003, the CPU 102 starts up a playback time display thread. Since the playback time display thread operates asynchronously with the processing of displaying the shooting duration time, it is possible to asynchronously perform the display of shooting duration time and the display of playback time. A procedure for the processing of the playback time display thread is illustrated in FIG. 10B and will be described below.

In step S1004, the CPU 102 obtains from the not-illustrated timer the shooting duration time from the start of the shooting.

In step S1005, the CPU 102 displays the shooting duration time.

In step S1006, the CPU 102 records moving image data. Here, data for one frame is recorded.

In step S1007, the CPU 102 determines whether the shooting is terminated. The processing proceeds to step S1008 in the case where it is determined that the shooting is terminated in step S1007 (YES in step S1007). The processing returns to step S1004 in the case where it is not determined that the shooting is terminated in step S1007 (NO in step S1007).

In step S1008, the CPU 102 sends a termination notification to the playback time display thread to bring the processing to end.

Hereinafter, the procedure for the processing of the playback time display thread after the playback time display thread is started up in step S1003 will be described with reference to FIG. 10B.

In step S1009, the CPU 102 calculates a time interval for updating the playback time display. The time interval ti for updating the playback time display is obtained from the following expression when the playback rate is Rp; the shooting rate is R; and the unit for displaying the playback time is tu:

$$ti = \frac{Rp}{R} tu$$

For example, in the case where the playback rate is 30 fps; the shooting rate is 120 fps, and the playback time display unit is 0.01 sec, the time interval ti for updating the playback time display is:

$ti = 30 \text{ (fps)}/120 \text{ (fps)} \times 0.01 \text{ (sec)} = 0.0025 \text{ (sec)}$.

In step 1010, the CPU 102 obtains the time elapsed from the update of the playback time display.

In step S1011, the CPU 102 determines whether the time elapsed from the playback time display update is longer than the updating interval. The updating interval is the time obtained by the calculation in step S1009. The processing returns to step S1010 in the case where it is determined that the time elapsed from the playback time display update is shorter than the updating interval (NO in step S1011). The processing proceeds to step S1012 in the case where it is determined that the time elapsed from the playback time display update is longer than the updating interval (YES in step S1011).

In step S1012, the CPU 102 obtains the playback time. Here, unlike the example illustrated in FIG. 9, the playback time is not obtained by a calculation but is obtained from a counter for playback time.

In step S1013, the CPU 102 updates the playback time display.

In step S1014, the CPU 102 determines whether the termination notification is received. The termination notification is sent to the playback time display thread in step S1008. The processing returns to step S1010 in the case where it is determined that the termination notification is not received in S1014 (NO in step S1014). The CPU 102 terminates the playback time display thread in the case where it is determined that the termination notification is received in S1014 (YES in step S1014).

As described above, it is possible to know the playback time during the shooting in the case of shooting the moving image of which the shooting duration time and the playback time are different from each other. Further, it is possible to display the shooting duration time and the playback time synchronously or asynchronously.

The shooting rate is not changed during shooting in the first exemplary embodiment. In a second exemplary embodiment of the present invention, a case of changing a shooting rate during shooting will be described.

Hereinafter, an operation for changing a shooting rate during shooting will be described.

Figure 11:
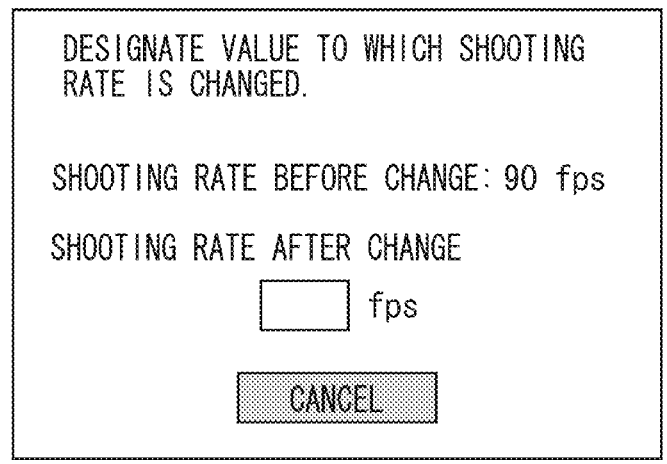
FIG. 11 is a diagram illustrating a screen displaying a menu for changing a shooting rate.

The user selects "change of shooting rate" in the menu illustrated in FIG. 4 and presses the button 203, so that a screen for changing a shooting rate illustrated in FIG. 11 is displayed on the LCD 201. In the screen illustrated in FIG. 11, a shooting rate before change and a shooting rate after change are displayed. The user uses the cursor key 205 to designate the shooting rate after change. The user presses the button 203 to decide the shooting rate after change.

Values of the playback time and the shooting duration time obtained during the shooting are recorded in a buffer just before the change of shooting rate which is conducted by using the screen illustrated in FIG. 11.

Figure 12:
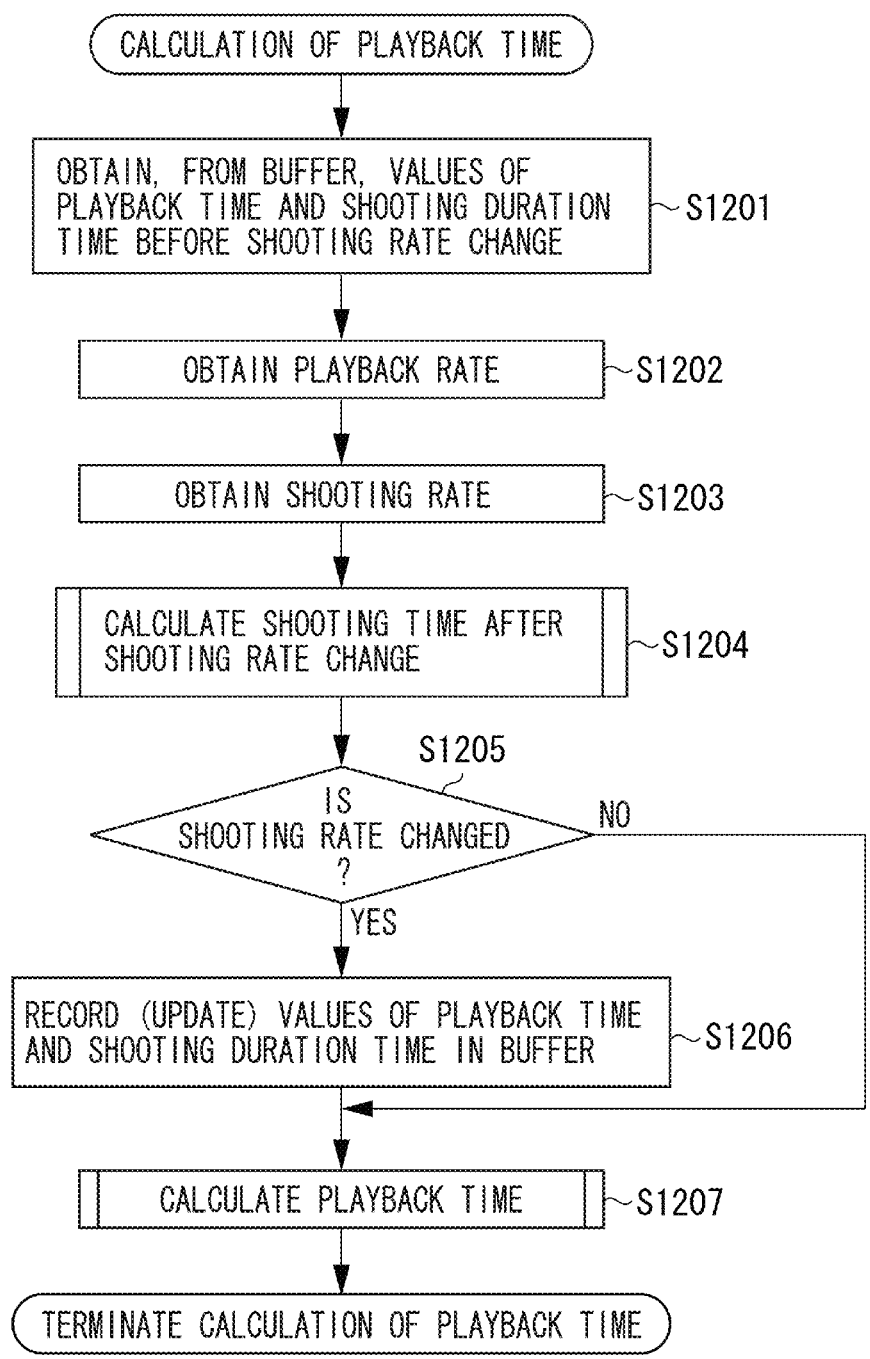
FIG. 12 is a diagram illustrating a procedure for calculating a playback time when a shooting rate is changed according to a second exemplary embodiment of the present invention.

Hereinafter, a procedure for calculating a playback time in the case where the shooting rate is changed will be described with reference to FIG. 12. The process relating to the shooting in this case is the same as that illustrated in FIG. 8.

In step S1201, the CPU 102 obtains from the buffer the values of playback time and shooting duration time before the shooting rate change.

In step S1202, the CPU 102 obtains the playback rate.

In step S1203, the CPU 102 obtains the changed shooting rate.

In step S1204, the CPU 102 calculates a shooting duration time elapsed from the shooting rate change. Here, the shooting duration time is obtained by calculating a difference between the values of the shooting duration time obtained in step S802 and the shooting duration time obtained from the buffer in step S1201.

In step S1205, the CPU 102 determines whether the shooting rate is changed. The processing proceeds to step S1206 in the case where it is determined that the shooting rate is changed in step S1205 (YES in step S1205). The processing proceeds to step S1207 in the case where it is determined that the shooting rate is not changed in step S1205 (NO in step S1205).

In step S1206, the CPU 102 records the values of the playback time and the shooting duration time in the buffer. In the case where preliminarily set values exist in the buffer, the values are updated.

In step S1207, the CPU 102 calculates the playback time and then terminates the processing related to the calculation of playback time. The playback time tp to be displayed after the shooting rate change is obtained from the following expression when the playback time calculated before the shooting rate change is to; the shooting rate after the change is R; the playback rate is Rp; and the shooting duration time elapsed after the shooting rate change is t;

$$tp = to + \frac{R}{Rp}t$$

For example, in the case where the shooting is performed at 90 fps for 60 seconds from the beginning and then at 270 fps after the shooting for 60 seconds; a shooting duration time of the shooting is 100 seconds; and a playback rate is 30 fps, the playback time tp is:

$tp$=90 (fps)/30 (fps)×60 (sec)+270 (fps)/30 (fps)×(100 (sec)−60 (sec))=540 (sec).

Since the playback time before the shooting rate change is stored in the buffer, the playback time before the shooting rate change is obtained by reading the value without any calculation.

As described above, in the case of changing the shooting rate during shooting, it is easy to know the playback time of the shot moving image based on the changed shooting rate.

The present invention is applicable to a system in which a computer which communicates with an imaging apparatus is a shooting control apparatus; a shooting mode, a shooting rate, and the like are set by using the computer; and the computer obtains an image which is shot by the imaging apparatus according to the settings. The present invention is also applicable to the case of displaying the shooting duration time and the playback time on a display unit of the computer in the system.

In this case, a communication unit is provided in each of the computer and the imaging apparatus, and the information of shooting rate and the information of shooting mode which are set by using the computer as well as an instruction signal for starting the shooting and the like are sent via the communication units. Also, image data obtained by the imaging apparatus is sent to the computer via the communication units.

Further, the computer calculates the shooting duration time and the playback time based on the settings of the shooting mode and the shooting rate and displays the shooting duration time and the playback time on the display unit.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. An imaging processing apparatus comprising:
   an input unit configured to input moving image data;
   a recording unit configured to convert a frame rate of a first moving image data which is input from the input unit at a first frame rate and record a second moving image data converted to a second frame rate to a recording medium;
   a selection unit configured to select an elapsed time to be displayed on a display from a first elapsed time equivalent to a time that elapses while the input unit is inputting a moving image and a second elapsed time equivalent to a time that elapses when the second moving image data is reproduced at the second frame rate; and
   a display control unit configured to display, the elapsed time selected by the selection unit on the display unit while the first moving image data is input from the input unit.

2. The imaging processing apparatus according to claim 1, wherein the input unit inputs moving image data shot by a shooting unit and the display control unit displays the elapsed time selected by the selection unit on the display unit a moving image is shot by the shooting unit.

3. The imaging processing apparatus according to claim 2, further comprising a shooting mode selection unit capable of selecting an interval shooting mode or a high speed shooting mode,
   wherein the display control unit displays the elapsed time selected by the selection unit on the display unit while the shooting is conducted in the interval shooting mode or the high speed shooting mode selected by the shooting mode selection unit.

4. The imaging processing apparatus according to claim 3, wherein the calculation unit calculates the playback time based on a changed frame rate in a case where a frame rate of the first moving image data is changed while the first moving image data is input by the input unit.

5. The imaging processing apparatus according to claim 1, further comprising a calculation unit configured to calculate a playback time in a case of playing back the second moving image based on a predetermined playback rate while the first moving image data is input by the input unit,
   wherein, in a case where the elapsed time at the second frame rate is selected to be displayed on the display unit by the selection unit, the display control unit displays the playback time calculated by the calculation unit on the display unit while the first moving image data is input by the input unit.

6. A method for controlling an imaging processing apparatus, the method comprising:
   inputting moving image data;
   converting a frame rate of a first moving image data which is input at a first rate and recording a second moving image data converted to a second frame rate to a recording medium;
   selecting an elapsed time to be displayed on a display from a first elapsed time equivalent to a time that elapses while the input unit is inputting a moving image and a second elapsed time equivalent to a time that elapses when the second moving image data is reproduced at the second frame rate; and
   displaying, according to the made selection, either one of the predetermined time or the playback time on the display unit while the first moving image data is input from the input unit.

7. A non-transitory computer readable storage medium having stored thereon a program for performing a method according to claim 6.

* * * * *